United States Patent
Gillston et al.

(10) Patent No.: US 7,527,048 B2
(45) Date of Patent: *May 5, 2009

(54) CATALYTIC COMBUSTION SURFACES AND METHOD FOR CREATING CATALYTIC COMBUSTION SURFACES

(75) Inventors: Lionel M. Gillston, Norristown, PA (US); Ronald P. Pacitti, Cherry Hill, NJ (US); Richard D. Pacitti, Cherry Hill, NJ (US)

(73) Assignee: Diesel Engine Transformation LLC, Philadelphia, PA (US)

(*) Notice: Subject to any disclaimer, the term of this patent is extended or adjusted under 35 U.S.C. 154(b) by 383 days.

This patent is subject to a terminal disclaimer.

(21) Appl. No.: 10/726,262

(22) Filed: Dec. 2, 2003

(65) Prior Publication Data
US 2005/0016512 A1    Jan. 27, 2005

Related U.S. Application Data

(63) Continuation of application No. 09/920,132, filed on Aug. 1, 2001, now Pat. No. 6,655,369.

(51) Int. Cl.
*F02B 77/02* (2006.01)
*F02B 51/02* (2006.01)

(52) U.S. Cl. .................................. 123/670; 123/188.3
(58) Field of Classification Search ............ 123/188.3, 123/668–670, 270–272
See application file for complete search history.

(56) References Cited

U.S. PATENT DOCUMENTS

| | | | |
|---|---|---|---|
| 1,731,202 A | * | 10/1929 | Phillips .................... 123/188.3 |
| 2,664,873 A | | 1/1954 | Graham |
| 2,914,048 A | | 11/1959 | Philipp |
| 3,166,859 A | | 1/1965 | Slayter et al. |
| 3,233,697 A | | 2/1966 | Slayter et al. |
| 3,302,394 A | | 2/1967 | Pahnke et al. |
| 3,419,363 A | | 12/1968 | Sliney |
| 3,459,167 A | | 8/1969 | Briggs et al. |
| 3,648,676 A | | 3/1972 | Lowman, Jr. |
| 3,649,225 A | | 3/1972 | Simmons |
| 3,660,173 A | | 5/1972 | Matsuno et al. |
| 3,820,523 A | | 6/1974 | Showalter et al. |

(Continued)

FOREIGN PATENT DOCUMENTS

JP    10-238320    *   9/1998

OTHER PUBLICATIONS

Process Coatings, Engine Coatings (visited May 21, 2001) <http://www.processcoatings.com/engine.htm>.

(Continued)

*Primary Examiner*—Hai H Huynh
(74) *Attorney, Agent, or Firm*—Reed Smith LLP

(57) ABSTRACT

A coating and coating process to improve the efficiency of hydrocarbon fueled engines, wherein the coating includes a high percentage of nickel to create a reaction which improves the combustion efficiency of the hydrocarbon fuel. The coating may also include chromium, iron, and other constituents and is applied to combustion surfaces with a sufficient bonding strength to allow the coating to function in the combustion chamber, while providing a surface having sufficient surface roughness to promote the chemical reaction underlying the combustion efficiency improvement. The nickel causes a catalytic cracking reaction to ease the combustibility of hydrocarbon molecules in the fuel.

2 Claims, 3 Drawing Sheets

U.S. PATENT DOCUMENTS

| | | | |
|---|---|---|---|
| 3,846,980 | A | 11/1974 | DePalma |
| 3,873,347 | A | 3/1975 | Walter et al. |
| 3,874,901 | A | 4/1975 | Rairden, III |
| 3,899,300 | A | 8/1975 | D'Olier |
| 3,911,875 | A | 10/1975 | Ysberg |
| 3,911,890 | A | 10/1975 | Ansdale |
| 3,911,891 | A | 10/1975 | Dowell |
| 3,927,026 | A | 12/1975 | Hecht et al. |
| 3,947,545 | A | 3/1976 | Ishida et al. |
| 3,969,082 | A | 7/1976 | Cairns et al. |
| 3,976,809 | A | 8/1976 | Dowell |
| 4,005,989 | A | 2/1977 | Preston |
| 4,074,671 | A | 2/1978 | Pennila |
| 4,077,637 | A | 3/1978 | Hyde et al. |
| 4,122,673 | A | 10/1978 | Leins |
| 4,132,743 | A | 1/1979 | Castor et al. |
| 4,254,621 | A | 3/1981 | Nagumo |
| 4,273,824 | A | 6/1981 | McComas et al. |
| 4,276,331 | A | 6/1981 | Bothwell |
| 4,300,494 | A | 11/1981 | Graiff et al. |
| 4,318,894 | A | 3/1982 | Hensel et al. |
| 4,330,732 | A | 5/1982 | Lowther |
| 4,332,618 | A | 6/1982 | Ballard |
| 4,335,190 | A | 6/1982 | Bill et al. |
| 4,339,509 | A | 7/1982 | Dardi et al. |
| 4,340,019 | A | 7/1982 | Barnert et al. |
| 4,353,208 | A | 10/1982 | Volker et al. |
| 4,471,017 | A | 9/1984 | Poeschel et al. |
| 4,485,151 | A | 11/1984 | Stecura |
| 4,495,907 | A | 1/1985 | Kamo |
| 4,536,371 | A | 8/1985 | Thayer et al. |
| 4,577,611 | A | 3/1986 | Hagino |
| 4,578,114 | A | 3/1986 | Rangaswamy et al. |
| 4,599,270 | A | 7/1986 | Rangaswamy et al. |
| 4,633,936 | A | 1/1987 | Nilsson |
| 4,659,680 | A | 4/1987 | Guile |
| 4,706,616 | A | 11/1987 | Yoshimitsu |
| 4,728,448 | A | 3/1988 | Sliney |
| 4,755,360 | A | 7/1988 | Dickey et al. |
| 4,772,511 | A | 9/1988 | Wood et al. |
| 4,773,368 | A | 9/1988 | Pfefferle |
| 4,810,334 | A | 3/1989 | Honey et al. |
| 4,819,595 | A | 4/1989 | Pfefferle |
| 4,849,247 | A | 7/1989 | Scanlon et al. |
| 4,852,542 | A | 8/1989 | Kamo et al. |
| 4,867,116 | A | 9/1989 | de Freitas Couto Rosa et al. |
| 4,877,705 | A | 10/1989 | Polidor |
| 4,880,614 | A | 11/1989 | Strangman et al. |
| 4,902,358 | A | 2/1990 | Napier et al. |
| 4,905,658 | A | 3/1990 | Pfefferle |
| 4,909,230 | A | 3/1990 | Kawamura |
| 4,916,022 | A | 4/1990 | Solfest et al. |
| 4,930,678 | A | 6/1990 | Cyb |
| 4,941,439 | A * | 7/1990 | Wicen ..................... 123/193.6 |
| 4,966,820 | A | 10/1990 | Kojima et al. |
| 4,985,092 | A | 1/1991 | Kaede et al. |
| 5,033,427 | A | 7/1991 | Kawamura et al. |
| 5,057,379 | A | 10/1991 | Fayeulle et al. |
| 5,080,056 | A | 1/1992 | Kramer et al. |
| 5,080,977 | A | 1/1992 | Zaplatynsky |
| 5,085,268 | A | 2/1992 | Nilsson |
| 5,136,994 | A | 8/1992 | Gale |
| 5,151,254 | A | 9/1992 | Arai et al. |
| 5,169,674 | A * | 12/1992 | Miller ..................... 427/456 |
| 5,211,153 | A * | 5/1993 | Yonekawa et al. .......... 123/668 |
| 5,236,787 | A | 8/1993 | Grassi |
| 5,292,382 | A | 3/1994 | Longo |
| 5,334,235 | A | 8/1994 | Dorfman et al. |
| 5,384,200 | A | 1/1995 | Giles et al. |
| 5,408,964 | A | 4/1995 | Rao |
| 5,419,126 | A | 5/1995 | Kiyooka |
| 5,431,136 | A | 7/1995 | Kenmoku et al. |
| 5,441,024 | A | 8/1995 | Wietig et al. |
| 5,462,907 | A | 10/1995 | Farrauto et al. |
| 5,468,295 | A | 11/1995 | Marantz et al. |
| 5,477,820 | A * | 12/1995 | Rao ..................... 123/193.6 |
| 5,491,120 | A | 2/1996 | Voss et al. |
| 5,495,837 | A | 3/1996 | Mitsuhashi et al. |
| 5,589,144 | A | 12/1996 | Filippi et al. |
| 5,611,306 | A | 3/1997 | Takano |
| 5,648,620 | A | 7/1997 | Stenzel et al. |
| 5,714,205 | A | 2/1998 | Marantz et al. |
| 5,722,379 | A | 3/1998 | Binder et al. |
| 5,819,774 | A * | 10/1998 | Beardsley et al. ............ 137/1 |
| 5,836,280 | A * | 11/1998 | Miyazawa ............. 123/193.4 |
| 5,866,518 | A | 2/1999 | Dellacorte et al. |
| 5,934,648 | A | 8/1999 | Rivers et al. |
| 5,958,332 | A | 9/1999 | Hoeg |
| 5,987,882 | A | 11/1999 | Voss et al. |
| 6,006,516 | A | 12/1999 | Voss et al. |
| 6,047,543 | A | 4/2000 | Caren et al. |
| 6,085,714 | A | 7/2000 | Wilson et al. |
| 6,095,107 | A | 8/2000 | Kloft et al. |
| H1869 | H * | 10/2000 | Beardsley et al. ........... 166/380 |
| 6,173,702 | B1 * | 1/2001 | Hoeg ..................... 123/668 |
| 6,177,200 | B1 * | 1/2001 | Maloney .................... 428/472 |
| 6,226,866 | B1 | 5/2001 | Wilson et al. |
| 6,255,249 | B1 | 7/2001 | Voss et al. |
| 6,256,984 | B1 | 7/2001 | Voss et al. |
| 6,298,817 | B1 | 10/2001 | Hoeg |
| 6,328,026 | B1 * | 12/2001 | Wang et al. .................. 123/668 |
| 6,517,959 | B1 * | 2/2003 | Beele ..................... 428/698 |
| 6,562,480 | B1 * | 5/2003 | Stong et al. ................ 428/546 |

OTHER PUBLICATIONS

Technical Papers, Techniques for Low NOx Combustion on Medium Speed Diesel Engine, (visited Jul. 11, 2001) <http://www.mesj.or.jp/bunken/english/text/mv28n012000p08.html>.

Emission Standards: USA, Urban Bus Retrofit Rebuild (UBRR) Program, (visited Jul. 9, 2001) <http://www.dieselnet.com/standards/us/ubrr.html>.

The U.S. Department of Energy, Engine Manufactures Associations, Manufacturers of Emission Controls Association, "Final Report: Diesel Oxidation Catalysts and Lean-$No_x$ Catalysts Jun. 2001", Diesel Emission Control—Sulfur Effects (DECSE) Program, pp. 1-99.

Jones, "Catalytic Combustion in Internal Combustion Engines: A Possible Explanation for the Woschni Effect in Thermally-Insulated Diesel Engines", Navel Research Laboratory, Nov. 1996, pp. i-26.

Kamo, "High Performance Coatings For Diesels and Other Heat Engines", Adiabatics, Inc., Advanced Engine Concepts, Thermal Spray Coatings Conference, Sep. 1993.

Kawamura, et al., "Improvement of Fuel Consumption and Exhaust Emissions in Ceramics Low Heat Rejection Engine", Isuzu Ceramics Research Institute Co., Ltd, ICE-vol. 27-1, 1996 Fall Technical Conference, vol. 1, ASME 1996, pp. 69-78.

Klett, et al., "Soot and $No._x$ Emissions and Combustion Characteristics of Low Heath Rejection Direct Injection Diesel Engines", U.S. Army Research Office, Jan. 1994, pp. I-iii, 1-109.

Osawa, et al., "Performance of Thin Thermal Barrier Coating on Small Aluminum Block Diesel Engine", SAE Technical Paper Series 910461, International Congress and Exposition, Feb./Mar. 1991, pp. 1-8.

Tree, et al., "Experimental Results on the Effect of Piston Surface Roughness and Porosity on Diesel Engine Combustion", Society of Automotive Engineers, Inc., 960036, Mar. 1996, pp. 103-112.

Tree, et al., "Experimental Measurements on the Effect of Insulated Pistons on Engine Performance and Heat Transfer", Society of Automotive Engineers, Inc., 960317, Mar. 1996, pp. 131-142.

Winkler, et al., "The Role of Diesel Ceramic Coatings in Reducing Automotive Emissions and Improving Combustion Efficiency", SAE Technical Paper Series 930158, Mar. 1993, pp. 1-9.

Wong, et al., "Assessment of Thin Thermal Barrier Coatings for I.C. Engines", SAE Technical Paper Series 950980, Internation Congress and Exposition, Feb./Mar. 1993, pp. 1-11.

Yonushonis, et al., "Engineered Thermal Barrier Coatings for Diesels", SAE Technical Paper Series 890297, International Congress and Exposition, Feb./Mar. 1989, pp. 133-142.

* cited by examiner

CATALYTIC COMBUSTION SURFACES AND METHOD FOR CREATING CATALYTIC COMBUSTION SURFACES

This application is a continuation of U.S. patent application Ser. No. 09/920,132, filed Aug. 1, 2001 now U.S. Pat. No. 6,655,369 and entitled "CATALYTIC COMBUSTION SURFACES AND METHOD FOR CREATING CATALYTIC COMBUSTION SURFACES, the entire disclosure of which is hereby incorporated by reference herein as if being set forth in its entirtey.

The present invention relates generally to increasing the efficiency and reducing emissions of internal combustion in engines. More particularly, the present invention relates generally to the application of coatings to internal combustion engines for the purpose of reducing unwanted emissions, and more particularly to the application of nickel coated materials to the combustion surfaces of reciprocating piston internal combustion engines to promote fuel combustion efficiency.

BACKGROUND

Internal combustion engines using hydrocarbon fuels are widely used due to their ability to create mechanical energy from a fuel that provides power for a sufficient time period without requiring complex or large fuel storage associated with the engine. Internal combustion engines may utilize the Diesel cycle, wherein self-ignition of the hydrocarbon fuel is used to initiate combustion of the hydrocarbon fuel. Hydrocarbon fuel used in Diesel cycle engines typically contains heavier petroleum fractions than the hydrocarbon fuel used in engines having spark ignition systems. The fuel having the heavier hydrocarbon fractions is typically called diesel fuel, even though the fuel can be used in spark ignited and spark assisted ignition engines designed to combust the heavier fractions. Engines using diesel fuel are widely used in commercial vehicles due to inherent efficiencies associated with the diesel fuel and the diesel cycle. Fuels utilizing the heavier hydrocarbon fractions tend to be less expensive than fuels using lighter hydrocarbon fractions, due to lower demand and reduced refining costs. The use of the higher fractionated fuel allows diesel fueled engines to utilize a higher compression ratio, resulting in a higher combustion efficiency.

Although diesel fueled engines are preferred in commercial applications, the use of diesel fueled engines is not without room for improvement. Normal operation of diesel fueled engines results in the production of harmful emissions, including soot and unburned hydrocarbon molecules. Diesel fueled engines tend to have higher exhaust emissions, particularly soot, when heavily loaded, or run in an improper state of tuning. Also, the cost of operating a diesel fueled engine is heavily influenced by the cost of the fuel being used in the engine.

The use of catalytic materials in the exhaust stream of hydrocarbon fueled engines has been implemented to reduce unwanted emissions. The catalytic effect in the exhaust stream accomplishes a reduction of unwanted emissions, but accomplishes the reduction of the unburned hydrocarbons downstream from the combustion chamber, such that energy released through the catalytic reaction is not utilized, and must be rejected as waste heat. Thus, the catalytic reaction provides no efficiency in the conversion of the hydrocarbon fuel into mechanical energy.

Technologies such as low heat rejection (LHR) coatings are being developed to improve the efficiency of fuel combustion in diesel fueled engines. LHR engines rely on the use of combustion surface coatings which form insulation or thermal barriers, thus retaining the heat of combustion within the combustion volume, allowing more of the combustion energy to be converted into mechanical energy, thus reducing the fuel consumption for a given power level. LHR technologies are presently directed towards the use of ceramic coatings applied to the combustion surfaces of an engine to inhibit heat transfer from the combustion products to the engine block and heads. The use of ceramic materials, however, raises issues related to lubrication of the reciprocating components, as well as to the formation of deposits on the coating surfaces (referred to as "coking") which inhibit combustion efficiency.

U.S. Pat. No. 5,987,882 to Voss et al. is directed towards combining a ceramic layer with an oxidation catalyst material, such as a rare-earth metal oxide. The described multi-component coating is claimed to increase the efficiency of combustion by retaining heat within the volume where the coating is applied. A benefit associated with such retention is an improved performance of the catalyst material, due to increased chemical action of the catalyst at elevated temperatures. Application of the coating to combustion surfaces of a reciprocating engine is described in the patent. The application described requires the integration of a bond coat as a bonding substrate below the insulative coating. The bond coat used for the described examples consisted of a 4 mil metal-aluminum-chromium-yttrium alloy, preferably using nickel, cobalt, or iron for the metallic component.

The use of rare-earth metallic oxide catalytic materials is, may be, however, susceptible to poisoning of the catalyst material. Sulfur contained in fuel to which the catalyst material is exposed prevents catalysts from functioning properly by causing sulfate production that inhibits catalyst regeneration. Accordingly, the use of catalytic technologies which incorporate materials such as platinum and praeseodymium oxide may be problematic when used with current diesel fuel, which contain sulfur levels sufficient to cause poisoning of the catalyst materials.

Other efforts towards improving the combustion efficiency of diesel fueled engines have been directed towards improved fuel formulations, combustion chamber size and shape, and the use of pre-ignition chambers. Each of these technologies may provide some gain with respect to combustion efficiency, however the costs associated with their implementation are not optimal when considered in light of the commercial applications in which the diesel fueled engines are used. The expense of reformulated fuels directly increases the operating costs of engine utilization. Intricate combustion chamber shapes, pre-ignition chambers, and ceramic-metallic coatings add to the production cost and complexity of the engines, as well as complicate maintenance issues and potentially the reliability of the engines themselves.

The use of coatings on engine components, including diesel fueled engine components, has generally been directed towards reduction of friction between components of the engine. The principal areas of interest have been the walls of the cylinder bore and the sealing rings, which extend between the skirt of a piston and the cylinder bore. U.S. Pat. No. 5,866,518 to Dellacorte et al. describes a composite material for use in high temperature applications. The Dellacorte composite consists primarily of chromium dioxide (60-80% by weight) in a metal binder having at least 50% nickel, chromium, or a combination of nickel and chromium. The greatest proportion of binder described is 60%, such that the highest proportion of nickel used in the coating is 30%, at which point no chromium is included. The Dellacorte patent describes the composite as providing a self-lubricating, friction and wear reducing material to be applied to the sealing rings.

U.S. Pat. No. 5,292,382 to Longo describes a sprayable molybdenum/iron coating which may be sprayed on piston rings as a means of reducing friction. The composition of the Longo material is described as 25-40% molybdenum, 4-8% chromium, 12-18% nickel, and 25-50% iron, with carbon, boron, and silicon additionally included in the composition.

SUMMARY OF THE INVENTION

The present invention is directed towards a combustion chamber surface coating and method for applying the coating to improve the combustion efficiency of internal combustion engines, particularly, but not necessarily limited to, those utilizing diesel fuel. The coating improves the combustion efficiency through a catalytic reaction with the hydrocarbon based fuel which causes hydrocarbon molecules to disassociate into free radicals at an accelerated rate. The higher concentration of free radicals drives the combustion reaction to a faster and more complete combustion of the hydrocarbon fuel, thus obtaining energy from the fuel more efficiently, as the more complete combustion provides more power per unit of fuel and less unwanted emissions.

The catalytic reaction is accomplished by providing a nickel surface on components which form the combustion chamber of the engine. The nickel reacts with the hydrocarbon molecules in a catalytic reaction which produces the free radicals. Although the nickel is believed to be the component driving the reaction, the use of a pure nickel surface may be limited only by the inactive characteristics of nickel in providing a surface with sufficient structural characteristics to provide a durable and reliable surface. Accordingly, the nickel may be alloyed with other materials to provide sufficient durability and reliability when used in the combustion chamber environment. Presently, an alloy comprising nickel, chromium, and iron has been employed, however other materials may be substituted, interchanged, or included in the composition as indicated by desired other properties.

The amount of free radicals which can be dissociated from hydrocarbon molecules is generally understood to be dependant on the contact of the hydrocarbon molecules and the nickel, and thus the amount of exposed surface area of the nickel appears to be related to the improvements in combustion efficiency gained. In addition to increasing the coating area, the surface of a coated area may be increased by forming the coating with a less smooth surface. Accordingly, the nickel surface may be formed by applying a coating according to the present invention to surfaces which form the combustion chamber by a high velocity oxygen flame process. This deposition method typically results in a coating having sufficient bonding strength to underlying structure to provide sufficient durability, while providing a surface roughness which limits coking of the engine while providing increased contact area between the nickel and hydrocarbon molecules.

In a first form, the present invention may be embodied in an internal combustion engine having at least one reciprocating component, a bore within which the at least one reciprocating component reciprocates, and a closure over one end of the bore. The reciprocating component has a combustion face. The reciprocating component reciprocates relative to the closure between TDC and BDC positions. A combustion volume is defined at least in part by the combustion face of the reciprocating component, and a surface of the closure. At least a portion of the surfaces which define the combustion volume are coated with a metallic coating which includes nickel, such that when the combustion face is at the position at which the combustion face is at a closest point to the closure, it has been noted that it is preferable to have at least 10% of the surfaces which define the combustion volume are coated with the coating, although lesser amounts of coating may also have efficiency.

In an alternate form, the present invention may be embodied in an internal combustion engine having a combustion volume and a reciprocating piston, with the reciprocating piston having a combustion face and the combustion engine further having a combustion volume. The combustion volume may be bounded by combustion surfaces. The combustion surfaces may include the combustion face of the reciprocating piston. A portion of the combustion surfaces equivalent in area to one tenth or more of the combustion face area is coated with a composition that is exposed to combustion gases. In its form, the composition may include between approximately 2% and approximately 80% nickel, between approximately 10% and approximately 30% chromium, and between approximately 10% and 90% iron, although other compositions may be possible.

In a further form, the present invention may be embodied in a process for reducing particulate emissions in a diesel fuel powered internal combustion engine, wherein the internal combustion engine comprises at least one cylinder having a combustion chamber. The process includes the steps of coating at least a portion of the inner surfaces of the combustion chamber with a composition which may include between 2% and 80% nickel and 10% and 40% chromium, (although other compositions may be possible) where the coating forms a surface exposed to combustion gases.

DETAILED DESCRIPTION OF THE INVENTION

Figure 1:
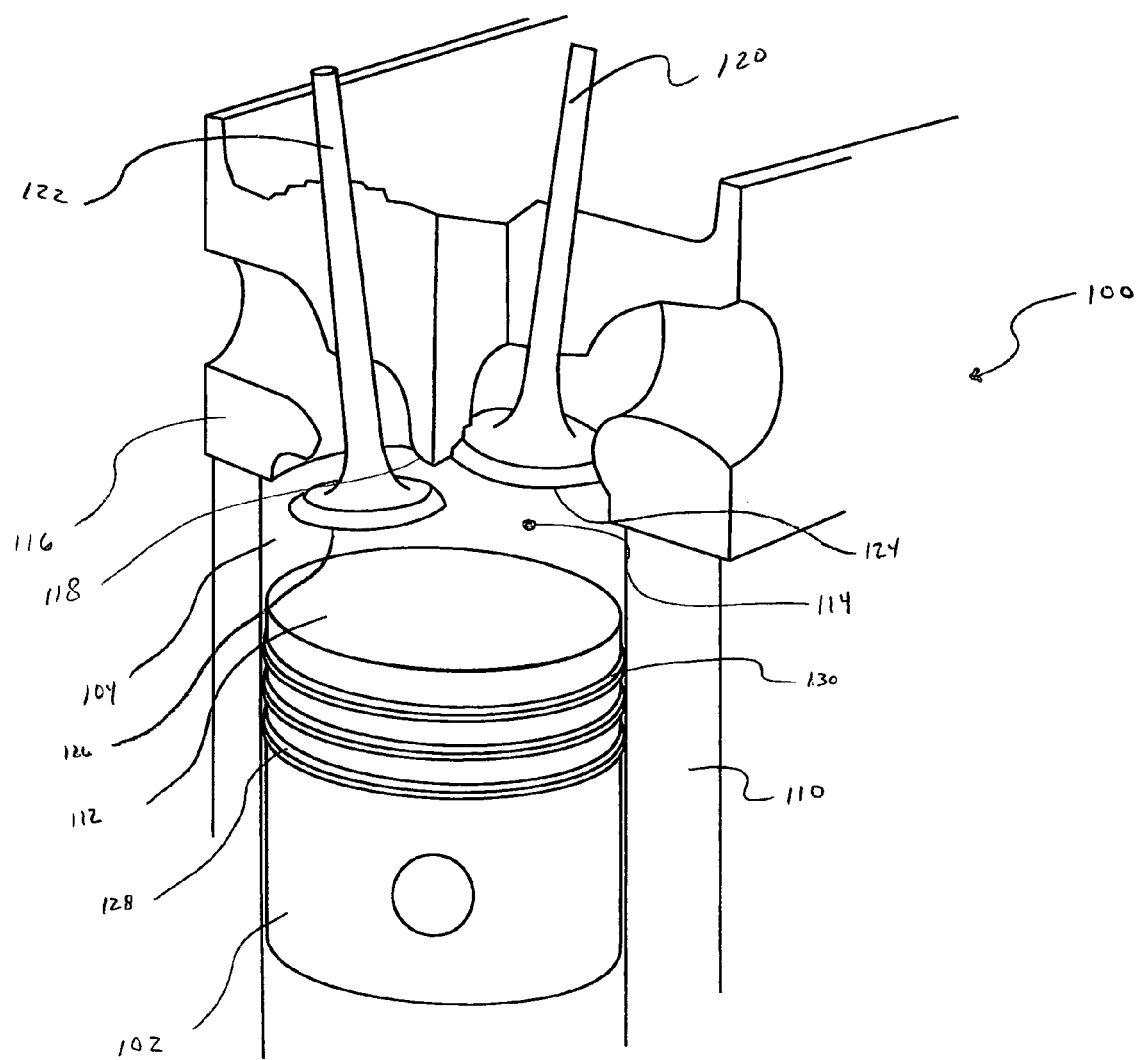
FIG. 1 is an illustration of an internal combustion engine to which the coating of the present invention has been applied, illustrating the combustion surfaces associated with the coating of the present invention.

Referring now to FIG. 1, wherein like reference numerals indicate like elements, there is shown the components of a diesel engine 100 to which the coatings of the present invention have been applied.

Figure 1B:
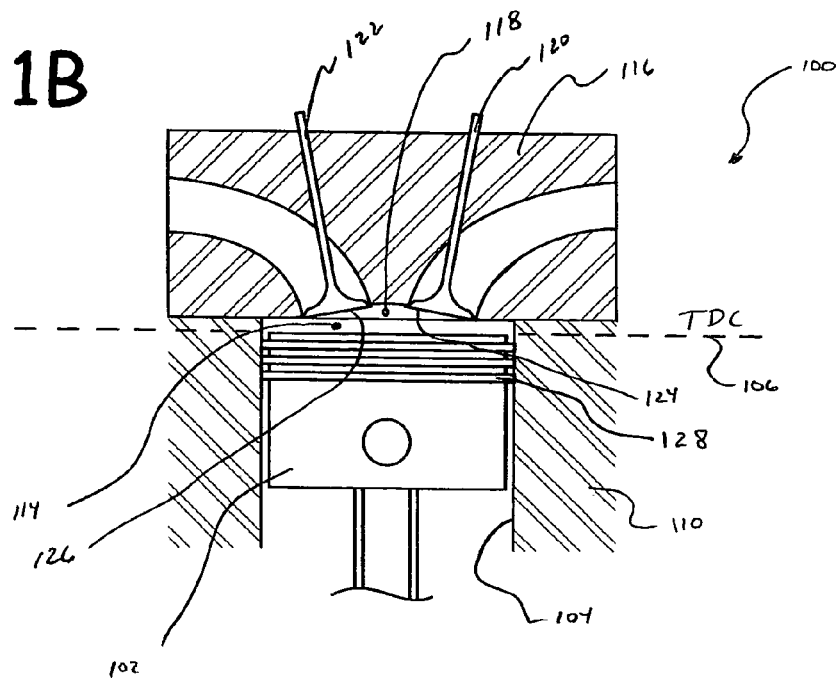
FIG. 1B is an illustration of an internal combustion engine to which the coating of the present invention has been applied, illustrating the piston in the top-dead-center (hereafter "TDC") position.
Figure 1C:
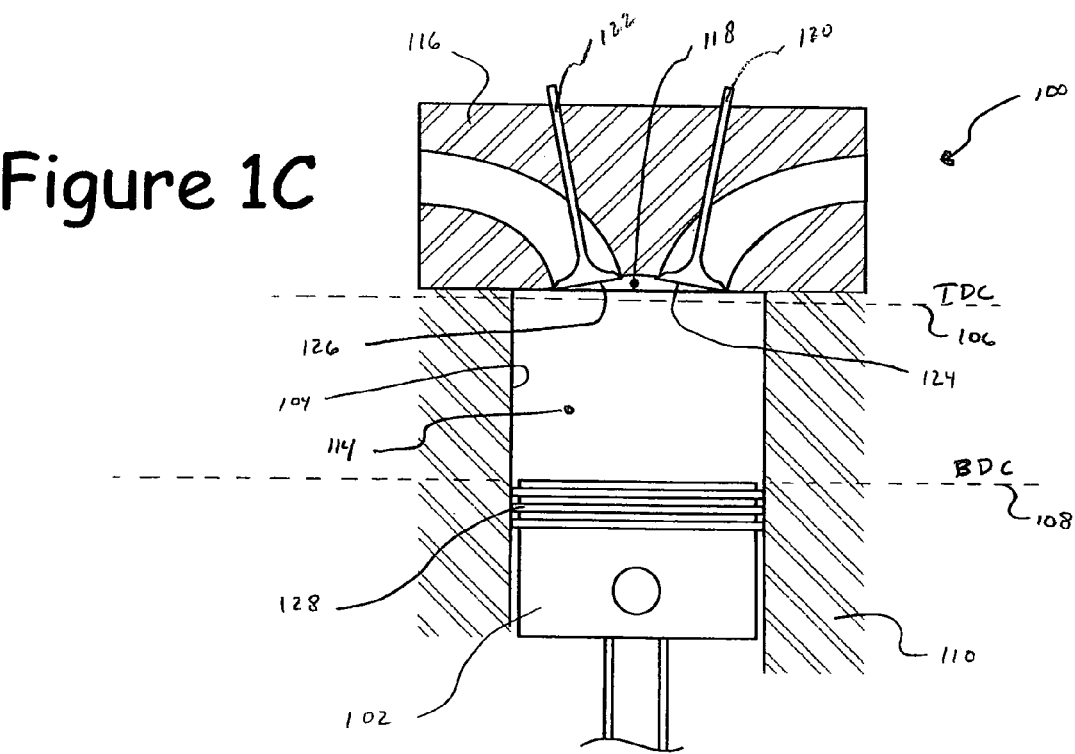
FIG. 1C is an illustration of an internal combustion engine to which the coating of the present invention has been applied, illustrating the piston in the bottom-dead-center (hereafter "BDC") position.
Figure 2:
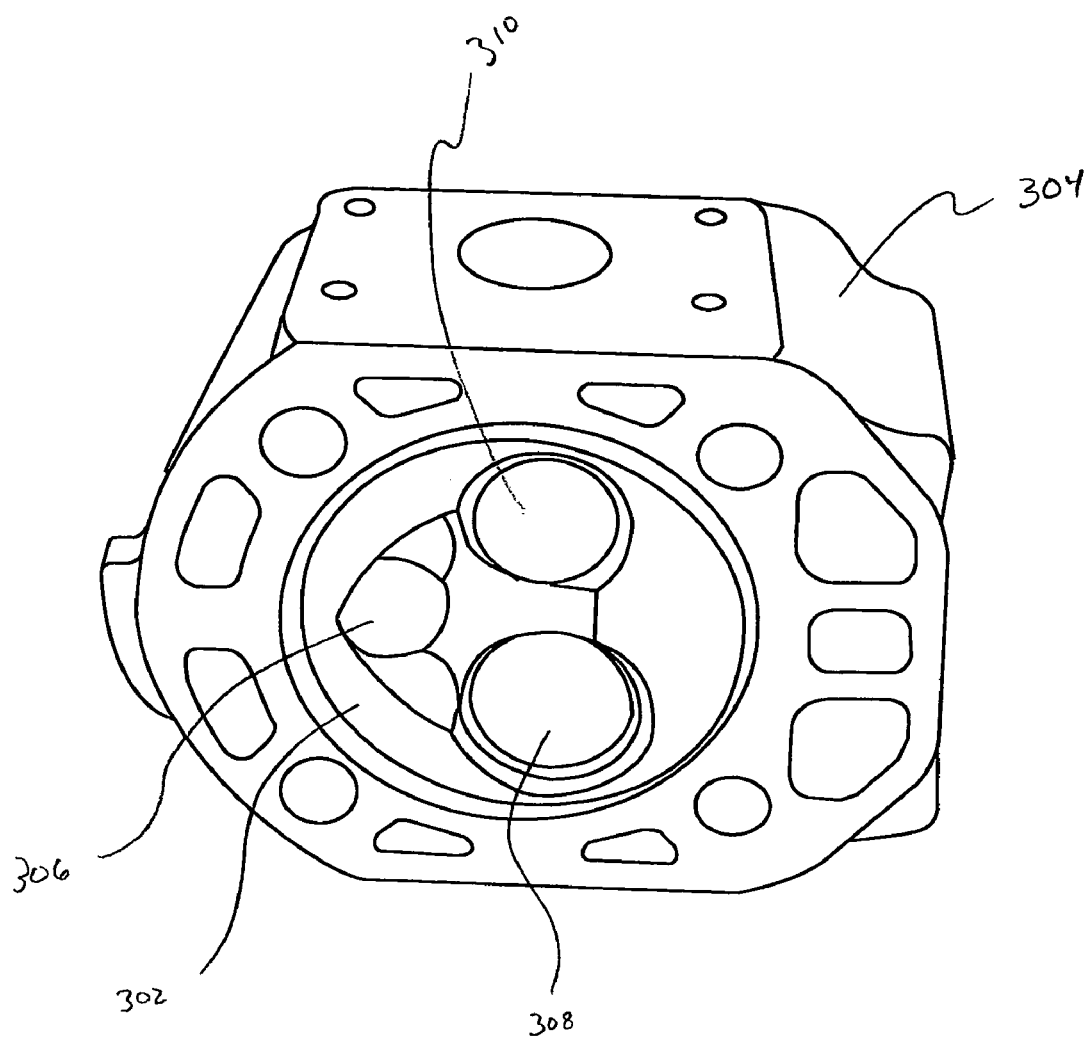
FIG. 2 is an illustration of the head of a Yanmar TS180C research engine used in the first illustrative embodiment, to which the coating of the present invention has been applied, identifying characteristics associated with the engine.

As shown in FIG. 1, a simple Diesel cycle reciprocating piston internal combustion engine includes a piston 102 that reciprocates in a bore 104. The bore 104 is closed at one end. The reciprocating piston 102 reciprocates between two positions. One position, commonly referred to as top dead center (shown in FIG. 1B and hereafter referred to as "TDC" 106), occurs when the piston is at its closest point of travel to the closed end of the bore. The other position, commonly referred to as bottom dead center (shown in FIG. 1C and hereafter referred to as "BDC" 108), occurs when the piston 102 is at its farthest point of travel from the closed end of the bore 104. Typically, the walls of the bore 104 may be integrally formed in an aluminum or cast iron engine block 110, or may be formed by liners inserted into an engine block 110. The walls of the bore 104, in conjunction with the closure at the one end of the bore 104 and the combustion face 112 of the piston 102, form the boundary of the combustion volume 114 associated with the piston 102. Owing to the motion of the reciprocating piston 102, the volume of the combustion volume 114 is not fixed, but rather varies with the position of the piston 102 within the bore 104.

In a typical engine, such as a diesel engine 100 to which the present invention may be applied, the closed end of the bore is formed by a head 116 that is bolted over one end of the bore 104. The head 116 is typically formed from cast iron. The head 116 typically includes a pocket 118 formed into the head 116 to provide a shaped pocket to improve the flow of an air/fuel mixture into and out of the combustion volume 114, which is typically accomplished through intake 120 and exhaust valves 122. The pocket 118 in the head 116 is typically called the combustion chamber, although the pocket 118 does not provide all of the surfaces that define the volume 114 within which combustion occurs. The intake 120 and exhaust 122 valves are typically located in the head 116 for manufacturing and maintenance concerns. When the valves 120, 122, are located in the head 116, the face of the intake valve 124 and the face of the exhaust valve 126 may form portions of the surfaces that form the combustion volume 114.

Accordingly, the surfaces to which the air/fuel mixture is exposed while the engine 100 is operating, thus bounding the combustion volume, may include, but are not limited to, the portion of the head and valves which close the bore 104, the side walls of the bore dependant on the position of the piston 102, and the combustion face 112 of the piston. Additionally, the use of sealing rings 128 between the piston 102 and the bore 104 may result in a surface of a sealing ring 128 forming a portion of the surface which bounds the combustion volume 114.

Application of the nickel coating of the present invention to these surfaces causes exposure of hydrocarbon molecules to the nickel that forms a portion of the coating. It is believed that the hydrocarbon molecules transform in the presence of the nickel, resulting in a free radical of a hydrocarbon molecule being chemisorbed to the nickel. At temperatures generally above approximately 700 degrees Fahrenheit, the free radical may be dissociated from the nickel coating. Such a free radical may combine more easily with oxygen during the combustion process, resulting in improved combustion efficiency.

Diesel fuels may be categorized by their cetane number. Cetane is $C_{16}H_{34}$ and contains methyl groups that are attached in a manner such that no free radicals are present. The cetane number is the percentage by volume of cetane in a mixture of liquid methylnaphthalene that gives the same ignition lag as the oil being tested.

When cetane or similar molecules are chemisorbed by metallic nickel, sufficient activation energy is imparted to the cetane molecule (or other hydrocarbon molecules) such that free methyl radicals may be formed. These free radicals may initiate chain reactions in hydrocarbon molecules away from the surface of the metallic nickel. In this manner molecules break up due the catalytic effect to the point where a faster and more complete combustion takes place.

The motion of gaseous molecules comprising the combustion gases is also believed to create friction between the molecules that generates both light and ions to form a corona. The effect of exposed dissimilar metals associated with a partially coated combustion volume is believed to promote the formation of this corona. This corona is believed to be discharged during the intake/combustion cycle, and energy associated with the discharge is believed to further oxidize hydrocarbons, residual carbon monoxide action and nitric oxide.

The corona effect is discussed in U.S. Pat. No. 6,047,543 to Caren et al. This patent discusses the use of a 25-watt device for generating a corona that is installed between the engine and a catalytic converter,. It is believed that hydrocarbons, residual carbon monoxide and nitric oxide may be oxidized by ionized oxygen in the presence of free electrons which results from the corona generating device.

The effect of magnetizing a surface to be coated during the coating process, as discussed further below, is believed to further strengthen the corona effect through the formation of additional ions. This magnetic effect is recognized in the waste water treatment systems, available commercially, where magnets are used to induce ionization and subsequent aqueous oxidation of hydrocarbons to water and carbon dioxide.

Although nickel is the element with which the hydrocarbon molecules react, the coating must have sufficient strength to withstand the pressures and effects of the combustion of the air fuel mixture (not shown). These effects include rapidly cycling temperatures, erosive effects associated with the flow of the air/fuel mixture into the combustion chamber, erosive effects associated with the flow of combusted air/fuel mixture out of the chamber, and corrosive effects associated with the combustion products in the high temperature environment resultant from combustion.

Accordingly, the use of a pure nickel coating is not advantageous, in that the nickel does not possess adequate strength to provide the surface unless alloyed with other materials. The addition of chromium and iron has been shown to provide adequate coating properties to provide adequate durability when used in commercial applications. As iron has catalytic properties of its own, the use of iron in the composition both provides needed structural properties, as well as may additionally improve the catalytic effect of the coating. The addition of chromium provides anti-corrosion properties which are beneficial to the durability of the coating. Other metals having catalytic properties, such as, but not limited to, cobalt, rhodium, osmium and iridium may also be incorporated.

The material selected must be chosen with consideration of the ability to withstand the thermal and pressure cycling associated with the combustion conditions within the combustion chamber. It is presently believed that ferritic stainless steels provide advantageous mechanical properties due to their lower tendency to become brittle in response to thermal cycling.

Commercially available alloys may be used for the coating material, such as 17-4 stainless steel or Inconel 625. The use of commercially available alloys may allow reductions in the cost of preparing the coating due to the off-the-shelf nature of the alloy, as opposed to the costs associated with having custom alloys prepared by a supplier. Inconel 625 contains a significant amount of molybdenum (approximately about 8-10%) to reduce friction between components in the reciprocating engine. When applied, however, to surfaces such as the combustion face 112 of the piston 102 and the pocket 118 formed in the head 116, the friction reduction properties are unnecessary, since there is no sliding contact between these components and any other component of the engine. Inconel has the further advantage of having a high Nickel content (approximately about >%58) to promote the catalytic interaction between the coating and combustion gases.

Earlier disclosures, such as Longo described above, teach the use of coatings comprising nickel and molybdenum to provide adequate surface characteristics for sealing rings for reciprocating piston internal combustion engines, however the small surfaces of the rings 128 exposed to the combustion chamber are inadequate to provide a significant effect associated with coating larger portions of the combustion surfaces. Additionally, the positioning of the sealing rings 128 typically results in the exposed surface of the top sealing ring 130 being shrouded from the air/fuel mixture by the piston 102.

As the efficiency improvement resultant from the present coating is resultant from interaction between hydrocarbon molecules and the nickel contained in the coating, it may be advantageous to select a surface finish to maximize the surface area of the coating exposed to the hydrocarbon molecules without forming an overly rough surface. Overly rough surface coatings promote coking of the combustion surfaces, which prevents exposure of the nickel content to the hydrocarbon molecules.

The coating may be applied to combustion surfaces using high velocity oxygen flame spray methods. Other known application methods may also be employed. These methods result in a surface roughness of approximately 200 RMS surface finish, as compared to a surface roughness of approximately 300 RMS associated with normally machined surfaces used in combustion engines. However, any suitable surface roughness may be employed to achieve the desired combustion characteristics.

The selection of surfaces on which to apply the coating may be made based on the cost of applying the coating to the component, the amount of exposed surface area that can be obtained through coating the component, and the utility of the coating on the surface to which the coating is to be applied. Coating friction surfaces such as sealing rings 128 and the bore 104 or bores of the engine may not be beneficial, due to the surface smoothness requirements of these components. The bore walls are not continuously exposed to the combustion products, as the travel of the reciprocating piston 102 alternately exposes and shields the walls from the combustion volume 114. The action of sealing rings 128 sliding across the walls also requires the presence of a lubricant to reduce friction between the components. The presence of the lubricant inhibits the reaction between hydrocarbon fuel molecules and the nickel by being interposed between the nickel surface and the hydrocarbon fuel. Accordingly, coated surface selection must be made in light of the beneficial effect that can be obtained by providing the coating.

The surfaces that provide the greatest benefit from coating are the surface of the pocket 118, the combustion face 112 of the piston 102, and the intake 124 and exhaust 126 valve faces. If the coating is being applied to a disassembled engine, access constraints are minimal. If only the head 116 of the engine is disassembled, such as during a maintenance action, the coating can be applied to the interior face of the combustion chamber and/or valve faces. Application of a coating to combustion face 112 of the piston may be problematic where the piston 102 remains in the bore 104 of the engine 100, such that an intermediate benefit can be obtained by coating only the interior face of the pocket 118, the faces of the intake 126 and/or exhaust 128, or a combination of these surfaces.

Alternatively, the use of the coating can be extended upstream or downstream from the combustion chamber. Since it is believed that the catalytic effect of the material is a cracking effect as opposed to an oxidation effect, the application of the catalytic material upstream from combustion chamber may allow greater reduction of heavier fractions prior to combustion. This effect will be limited where direct injection is utilized, due to the lack of fuel hydrocarbon, in the intake stream. Additionally, the cracking effect may also reduce unwanted emissions by reducing heavier hydrocarbon fractions in the exhaust stream.

First Illustrative Embodiment

A six-cylinder diesel engine installed in a Ford 7000 cargo truck was used as a proof of concept test project. The engine was originally made in Brazil, and had been used commercially for approximately 160,000 miles before being procured for the present testing.

The characteristics of the engine are listed in Table 1 below.

The 6.6 L engine includes 6 cylinders in an in-line configuration. The engine utilizes a cast iron block and head. The engine does not utilize liners in the bores. The head contains 6 intake and 6 exhaust valves, one of each per cylinder.

TABLE 1

| | |
|---|---|
| No of Cylinders: | 6 |
| Engine Displacement: | 6.6 L |
| Engine Bore: | 111.8 mm |
| Engine Stroke: | 111.8 mm |
| Piston Diameter: | 111.34 mm |
| Intake Valve Diameter: | 47.99 mm |
| Exhaust Valve Diameter: | 42.74 mm |
| Compression Ratio: | 17.5:1 |
| Surface Area of Piston ($SA_p$) (based on Piston Diameter): | 9736 mm |
| Surface Area of Combustion Chamber: | 6573 (Estimate) |
| Surface Area of Valves: | 3243.4 |
| Coated Surface Area (SAC): | 9816 |
| Ratio SAC to $SA_p$: | 1.008 |

An initial emissions test in accordance with the New Jersey Methodology yielded an opacity rating of 25.6. The engine was cleaned using MotorVac™ equipment. The MotorVac™ equipment uses a diesel fuel fortified with cleaning agents to remove deposits from the fuel systems and combustion chamber of the diesel engine. An engine being cleaned using the MotorVac™ is operated with the substitute fuel to cause the fortified diesel fuel to be circulated through the engine.

Following completion of the cleaning process, the engine was emissions tested utilizing the original uncoated cast iron head. In accordance with the New Jersey opacity test, the engine yielded an opacity rating of 19.8. The cast iron head was then coated in accordance with the present process with a 4-5 mil thick coating of no more than 0.07% carbon, between 15 and 17% chromium, 4% nickel, 2.75% copper, and 75% iron and trace elements (this composition is commonly called "17-4 Stainless Steel"). The engine was then again tested in accordance with the New Jersey opacity testing standard, and yielded an opacity rating of 17.6.

As a means of correlating the amount of coated area within the combustion chamber to the total combustion chamber surface area, the coated area of a single combustion chamber may be expressed as a ratio of the coated area to the area of the combustion face of the piston, hereafter called the coating factor. Using such a measurement allows the ratio to be expressed without requiring definition of a fixed combustion chamber area, since the combustion ratio surface varies as the piston reciprocates.

For the engine of the present illustration, the diameter of the bore is 111.8 mm. Due to the necessity of under sizing the piston relative to the bore, the piston has a minimum allowable diameter of 111.34 mm. Accordingly, the area of the combustion face is approximately 9736 mm$^2$ (assuming a flat top piston). If the combustion face of a 47.99 mm intake valve were coated, the surface area of the coating would be approximately 1808 mm$^2$, yielding a coating factor of approximately 0.185. If both the combustion face 126 of the piston 102 and the face 124 of the intake valve 120 were coated, the coating factor would be approximately 1.185. It is evident from this that the coating factor can exceed unity, since the total area bounding the combustion includes the area of the combustion face as well as the area of the pocket 118, valve faces 120, 128, and exposed portions of the bore 102.

In the sample engine embodiment, the interior surface of the combustion chamber and the faces of the valves were coated. The combustion face of the piston, and the walls of the bore remained uncoated. It is estimated that the surface area of the coated portion of the combustion chamber was approximately 9816 mm$^2$, yielding a coating factor of approximately 1.008. As noted above, this engine was run in both uncoated and coated conditions. The operating efficiency of the engine as indicated by emissions from the engine were as shown in Table 2.

TABLE 2

| Configuration | Description | Opacity |
|---|---|---|
| Baseline | | 26.8 |
| After MotorVac | | 19.8 |
| Coated (after MotorVac) | | 17.6 |

The application of the coating was not limited to the interior surface of the combustion chamber, but rather extended onto the mating surface of the head where the head mates to the engine block. It is important to note that the mating surface of the head was milled prior to coating to remove an equivalent thickness to the coating thickness to mitigate any effects that could have been caused by increased combustion volume resultant from the additional thickness of the coating on the mating surface.

Second Illustrative Embodiment

The coating of the present invention has also been applied to a single cylinder Yanmor TS180C research engine. The research engine uses a typical cross flow head. The engine also utilizes direct injection. The parameters of the engine were as follows:

TABLE 3

| | |
|---|---|
| Engine Displacement: | 8661 L |
| Engine Bore: | 102 mm |
| Engine Stroke: | 106 mm |
| Piston Diameter: | 101 mm (estimate) |
| Intake Valve Diameter: | 42.7 mm |
| Exhaust Valve Diameter: | 33.5 mm |
| Compression Ratio: | 19.8 |
| Surface Area of Piston (SAp) (based on est. Piston Diameter): | 8011.6 mm$^2$ |
| Surface Area of Combustion Chamber: | 5890 mm$^2$ (est.) |
| Surface Area of Valves: | 2313.4 mm$^2$ |
| Coated Surface Area (SAC): | 8200 mm$^2$ (est.) |
| Ratio SAC to SAp: | 1.023 |

The performance improvements resultant from coating the head and valves (which yielded a 1.023 SAC to SA$_p$ ratio) were as shown in the following table. The mode 4 data appears to yield aberrant data, however this is believed due to effects associated with the slow speed in conjunction with the single cylinder configuration. As averaged between the various modes, the resultant improvements were as follows:

TABLE 4

| Constituent | Baseline | Coated Head | % Change |
|---|---|---|---|
| HC | 1.101877 g/kW-hr | .855357 g/kW-hr | −22.4% |
| CO | 3.66792 g/kW-hr | 3.66792 g/kW-hr | −22.1% |
| CO$_2$ | 908.0019 g/kW-hr | 983.3241 g/kW-hr | +8.3% |
| NO | 5.867477 g/kW-hr | 8.17224 g/kW-hr | +39.3% |
| NO$_2$ | 0.853066 g/kW-hr | .543094 g/kW-hr | −36.3% |
| Particulate (PM) | 1.937068 g/kW-hr | 1.392242 g/kW-hr | −28.1% |

TABLE 5

| Baseline Mode IV | | | mair/mfuel | 14.673652 | | | | | | |
|---|---|---|---|---|---|---|---|---|---|---|
| MAF (freq) | 3143 | Hz | Air Fuel Ratio | 95.1 | | HC | 0.0373 | g/min | Brake Power | 1.50 kW |
| Mass Air Flow | 803 | g/min | Exhaust Density | 0.843 | kg/m3 | CO | 0.180 | g/min | HC | 1.49 g/kW-hr |
| Fuel Consumption | 8.44 | g/min | Mass Exhaust | 811 | g/min | CO$_2$ | 26.9 | g/min | CO | 7.22 g/kW-hr |
| Exhaust Temp. | 154° | C. | Volume Exhaust | 0.962 | m3/min | NO | 0.216 | g/min | CO$_2$ | 1076 g/kW-hr |
| HC | 92.5 | ppm | Moles in Exhaust | 27.5 | mol/min | NO$_2$ | 0.0372 | g/min | NO | 8.65 g/kW-hr |
| CO | 235 | ppm | HC | 0.00254 | mol/min | HC | 4.41 | g/kg fuel | NO$_2$ | 1.49 g/kW-hr |
| CO$_2$ | 31375 | ppm | CO | 0.00644 | mol/min | CO | 21.4 | g/kg fuel | Fuel Consumption | 338 g/kW-hr |
| NO | 262 | ppm | CO$_2$ | 0.611 | mol/min | CO$_2$ | 3184 | g/kg fuel | Particulate | 5.04 g/kg fuel |
| NO$_2$ | 29.5 | ppm | NO | 0.00720 | mol/min | NO | 25.6 | g/kg fuel | Particulate | 1.70 g/kW-hr |
| speed | 1380 | rpm | NO$_2$ | 0.000809 | mol/min | NO$_2$ | 4.41 | g/kg fuel | | |
| load | 7.65 | ft-lb | Theoretical CO$_2$ | 22243 | → | % Difference | 41.1 | | | |
| particulate mass | 2.86 | mg | | | | | | | | |
| Mode III | | | | | | | | | | |
| MAF (freq) | 3479 | Hz | Air Fuel Ratio | 59.3 | | HC | 0.0995 | g/min | Brake Power | 3.83 kW |
| Mass Air Flow | 1095 | g/min | Exhaust Density | 0.704 | kg/m3 | CO | 0.214 | g/min | HC | 1.56 g/kW-hr |
| Fuel Consumption | 18.5 | g/min | Mass Exhaust | 1114 | g/min | CO$_2$ | 59.5 | g/min | CO | 3.34 g/kW-hr |
| Exhaust Temp. | 238° | C. | Volume Exhaust | 1.58 | m3/min | NO | 0.387 | g/min | CO$_2$ | 931 g/kW-hr |
| HC | 180 | ppm | Moles in Exhaust | 37.7 | mol/min | NO$_2$ | 0.0671 | g/min | NO | 6.05 g/kw-hr |
| CO | 202 | ppm | HC | 0.00679 | mol/min | HC | 5.39 | g/kg fuel | NO$_2$ | 1.05 g/kW-hr |
| CO$_2$ | 49690 | ppm | CO | 0.00763 | mol/min | CO | 11.6 | g/kg fuel | Fuel Consumption | 289 g/kW-hr |

TABLE 5-continued

| | | | | | | | | |
|---|---|---|---|---|---|---|---|---|
| NO | 342 ppm | $CO_2$ | 1.35 mol/min $CO_2$ | | 3225 g/kg fuel | Particulate | 9.88 g/kg fuel |
| $NO_2$ | 38.7 ppm | NO | 0.0129 mol/min NO | | 20.9 g/kg fuel | Particulate | 2.85 g/kW-hr |
| speed | 1773 rpm | $NO_2$ | 0.00146 mol/min $NO_2$ | | 3.63 g/kg fuel | | |
| load | 15.2 ft-lb | Theoretical $CO_2$ | 35874 → | % Difference | 38.5 | | |
| particulate mass | 8.93 mg | | | | | | |
| | 13.23 | | | | | | |
| Mode II | | | | | | | | |
| MAF (freq) | 3703 Hz | Air Fuel Ratio | 44.8 | HC | 0.112 g/min | Brake Power | 6.63 kW |
| Mass Air Flow | 1313 g/min | Exhaust Density | 0.588 k/m3 | CO | 0.311 g/min | HC | 1.01 g/kW-hr |
| Fuel Consumption | 29.3 g/min | Mass Exhaust | 1342 g/min | $CO_2$ | 96 g/min | CO | 2.82 g/kW-hr |
| Exhaust Temp. | 340° C. | Volume Exhaust | 2.284 m3/min | NO | 0.580 g/min | $CO_2$ | 865 g/kW-hr |
| HC | 167 ppm | Moles in Exhaust | 45.4 mol/min | $NO_2$ | 0.0823 g/min | NO | 5.25 g/kW-hr |
| CO | 245 ppm | HC | 0.00760 mol/min HC | | 3.80 g/kg fuel | $NO_2$ | 0.745 g/kW-hr |
| $CO_2$ | 68148 ppm | CO | 0.0111 mol/min CO | | 10.6 g/kg fuel | Fuel Consumption | 265 g/kW-hr |
| NO | 426 ppm | $CO_2$ | 2.17 mol/min $CO_2$ | | 3260 g/kg fuel | Particulate | 7.13 g/kg fuel |
| $NO_2$ | 39.4 ppm | NO | 0.0193 mol/min NO | | 19.8 g/kg fuel | Particulate | 1.89 g/kW-hr |
| speed | 2007 rpm | $NO_2$ | 0.00179 mol/min $NO_2$ | | 2.81 g/kg fuel | | |
| load | 23.3 ft-lb | Theoretical $CO_2$ | 47824 → | % Difference | 42.5 | | |
| particulate mass | 8.50 mg | | | | | | |
| Mode I | | | | | | | | |
| MAF (freq) | 3811 Hz | Air Fuel Ratio | 35.8 | HC | 0.105 g/min | Brake Power | 9.01 kW |
| Mass Air Flow | 1424 g/min | Exhaust Density | 0.495 kg/m3 | CO | 0.506 g/min | HC | 0.700 g/kW-hr |
| Fuel Consumption | 39.7 g/min | Mass Exhaust | 1463 g/min | $CO_2$ | 131 g/min | CO | 3.37 g/kW-hr |
| Exhaust Temp. | 454° C. | Volume Exhaust | 2.96 m3/min | NO | 0.779 g/min | $CO_2$ | 871 g/kW-hr |
| HC | 145 ppm | Moles in Exhaust | 49.5 mol/min | $NO_2$ | 0.0750 g/min | NO | 5.19 g/kW-hr |
| CO | 365 ppm | HC | 0.00717 mol/min HC | | 2.65 g/kg fuel | $NO_2$ | 0.499 g/kW-hr |
| $CO_2$ | 87506 ppm | CO | 0.0181 mol/min CO | | 12.8 g/kg fuel | Fuel Consumption | 264 g/kW-hr |
| NO | 524 ppm | $CO_2$ | 2.98 mol/min $CO_2$ | | 3296 g/kg fuel | Particulate | 5.82 g/kg fuel |
| $NO_2$ | 32.9 ppm | NO | 0.0260 mol/min NO | | 19.6 g/kg fuel | Particulate | 1.54 g/kW-hr |
| speed | 2199 rpm | $NO_2$ | 0.00163 mol/min $NO_2$ | | 1.89 g/kg fuel | | |
| load | 28.9 ft-lb | Theoretical $CO_2$ | 60060 → | % Difference | 45.7 | | |
| particulate mass | 8.61 mg | | | | | | |
| ISO 8178 Weighted Average Totals | | | | | | | | |
| HC | 1.101877 g/kWh | | | | | | |
| CO | 3.66792 g/kWh | | | | | | |
| $CO_2$ | 908.0019 g/kWh | | | | | | |
| NO | 5.867477 g/kWh | | | | | | |
| $NO_2$ | 0.853066 g/kWh | | | | | | |
| Particulate | 1.937068 g/kWh | | | | | | |

TABLE 6

| | | | | | | | | |
|---|---|---|---|---|---|---|---|---|
| Coated Head | | | | | | | | |
| Mode IV | | | | | | | | |
| MAF (freq) | 3191 Hz | Air Fuel Ratio | 89.4 | HC | 0.0448 g/min | Brake Power | 1.45 kW |
| Mass Air Flow | 842 g/min | Exhaust Density | 0.817 kg/m3 | CO | 0.146 g/min | HC | 1.85 g/kW-hr |
| Fuel Consumption | 9.41 g/min | Mass Exhaust | 851 g/min | $CO_2$ | 30.0 g/min | CO | 6.05 g/kW-hr |
| Exhaust Temp. | 168° C. | Volume Exhaust | 1.04 m3/min | NO | 0.338 g/min | $CO_2$ | 1240 g/kW-hr |
| HC | 106 ppm | Moles in Exhaust | 28.8 mol/min | $NO_2$ | 0.0264 g/min | NO | 14.0 g/kW-hr |
| CO | 181 ppm | HC | 0.00305 mol/min HC | | 4.76 g/kg fuel | $NO_2$ | 1.09 g/kW-hr |
| $CO_2$ | 49438 ppm | CO | 0.00523 mol/min CO | | 15.5 g/kg fuel | Fuel Consumption | 389 g/kW-hr |
| NO | 391 ppm | $CO_2$ | 0.68 mol/min $CO_2$ | | 3189 g/kg fuel | Particulate | 7.97 g/kg fuel |
| $NO_2$ | 19.9 ppm | NO | 0.0113 mol/min NO | | 35.9 g/kg fuel | Particulate | 3.10 g/kW-hr |
| speed | 1393 rpm | $NO_2$ | 0.000574 mol/min $NO_2$ | | 2.80 g/kg fuel | | |
| load | 7.34 ft-lb | Theoretical $CO_2$ | 23672 → | % Difference | 109 | | |
| particulate mass | 4.81 mg | | | | | | |
| Mode III | | | | | | | | |
| MAF (freq) | 3522 Hz | Air Fuel Ratio | 57.5 | HC | 0.0815 g/min | Brake Power | 3.79 kW |
| Mass Air Flow | 1136 g/min | Exhaust Density | 0.678 kg/m3 | CO | 0.222 g/min | HC | 1.29 g/kW-hr |
| Fuel Consumption | 19.7 g/min | Mass Exhaust | 1156 g/min | $CO_2$ | 64 g/min | CO | 3.51 g/kW-hr |
| Exhaust Temp. | 258° C. | Volume Exhaust | 1.70 m3/min | NO | 0.521 g/min | $CO_2$ | 1008 g/kW-hr |
| HC | 142 ppm | Moles in Exhaust | 39.1 mol/min | $NO_2$ | 0.0555 g/min | NO | 8.24 g/kW-hr |
| CO | 202 ppm | HC | 0.00555 mol/min HC | | 4.13 g/kg fuel | $NO_2$ | 0.88 g/kW-hr |
| $CO_2$ | 79181 ppm | CO | 0.00792 mol/min CO | | 11.2 g/kg fuel | Fuel | 312 g/kW-hr |

TABLE 6-continued

| | | | | | | | | | |
|---|---|---|---|---|---|---|---|---|---|
| NO | 444 | ppm | $CO_2$ | 1.45 | mol/min $CO_2$ | 3228 | g/kg fuel | Consumption Particulate | 6.53 g/kg fuel |
| $NO_2$ | 30.9 | ppm | NO | 0.0174 | mol/min NO | 26.4 | g/kg fuel | Particulate | 2.04 g/kW-hr |
| speed | 1761 | rpm | $NO_2$ | 0.00121 | mol/min $NO_2$ | 2.81 | g/kg fuel | | |
| load | 15.2 | ft-lb | Theoretical $CO_2$ | 37022 | → % Difference | 113.9 | | | |
| particulate mass | 8.08 | mg | | | | | | | |
| Mode II | | | | | | | | | |
| MAF (freq) | 3703 | Hz | Air Fuel Ratio | 43.9 | | HC | 0.0618 g/min | Brake Power | 6.42 kW |
| Mass Air Flow | 1313 | g/min | Exhaust Density | 0.568 | kg/m3 | CO | 0.221 g/min | HC | 0.578 g/kW-hr |
| Fuel Consumption | 29.9 | g/min | Mass Exhaust | 1343 | g/min | $CO_2$ | 98 g/min | CO | 2.06 g/kW-hr |
| Exhaust Temp. | 361° | C. | Volume Exhaust | 2.366 | m3/min | NO | 0.768 g/min | $CO_2$ | 913 g/kW-hr |
| HC | 92.7 | ppm | Moles in Exhaust | 45.5 | mol/min | $NO_2$ | 0.0485 g/min | NO | 7.18 g/kW-hr |
| CO | 173 | ppm | HC | 0.00421 | mol/min HC | | 2.07 g/kg fuel | $NO_2$ | 0.453 g/kW-hr |
| $CO_2$ | 117828 | ppm | CO | 0.00788 | mol/min CO | | 7.38 g/kg fuel | Fuel Consumption | 280 g/kW-hr |
| NO | 563 | ppm | $CO_2$ | 2.219 | mol/min $CO_2$ | 3263 | g/kg fuel | Particulate | 2.75 g/kg fuel |
| $NO_2$ | 23.2 | ppm | NO | 0.02560 | mol/min NO | 25.7 | g/kg fuel | Particulate | 0.770 g/kW-hr |
| speed | 1995 | rpm | $NO_2$ | 0.001054 | mol/min $NO_2$ | 1.62 | g/kg fuel | | |
| load | 22.7 | ft-lb | Theoretical $CO_2$ | 48801 | → % Difference | 141 | | | |
| particulate mass | 3.34 | mg | | | | | | | |
| Mode I | | | | | | | | | |
| MAF (freq) | 3827 | Hz | Air Fuel Ratio | 33.9 | | HC | 0.0707 g/min | Brake Power | 8.88 kW |
| Mass Air Flow | 1441 | g/min | Exhaust Density | 0.470 | kg/m3 | CO | 0.291 g/min | HC | 0.478 g/kW-hr |
| Fuel Consumption | 42.5 | g/min | Mass Exhaust | 1483 | g/min | $CO_2$ | 140 g/min | CO | 1.97 g/kW-hr |
| Exhaust Temp. | 494° | C. | Volume Exhaust | 3.16 | m3/min | NO | 0.927 g/min | $CO_2$ | 949 g/kW-hr |
| HC | 96.0 | ppm | Moles in Exhaust | 50.2 | mol/min | $NO_2$ | 0.0156 g/min | NO | 6.26 g/kW-hr |
| CO | 207 | ppm | HC | 0.00482 | mol/min HC | | 1.66 g/kg fuel | $NO_2$ | 0.11 gmkW-hr |
| $CO_2$ | 167474 | ppm | CO | 0.01041 | mol/min CO | | 6.86 g/kg fuel | Fuel Consumption | 287 g/kW-hr |
| NO | 615 | ppm | $CO_2$ | 3.19 | mol/min $CO_2$ | 3307 | g/kg fuel | Particulate | 4.12 g/kg fuel |
| $NO_2$ | 6.8 | ppm | NO | 0.0309 | mol/min NO | 21.8 | g/kg fuel | Particulate | 1.18 g/kW-hr |
| speed | 2197 | rpm | $NO_2$ | 0.000339 | mol/min $NO_2$ | 0.37 | g/kg fuel | | |
| load | 28.5 | ft-lb | Theoretical $CO_2$ | 63592 | → % Difference | 163 | | | |
| particulate mass | 6.44 | mg | | | | | | | |
| ISO 8178 Weighted Average Totals | | | | | | | | | |
| HC | 0.855357 | g/kWh | | | | | | | |
| CO | 2.855434 | g/kWh | | | | | | | |
| $CO_2$ | 983.3241 | g/kWh | | | | | | | |
| NO | 8.17224 | g/kWh | | | | | | | |
| $NO_2$ | 0.543094 | g/kWh | | | | | | | |
| Particulate | 1.392242 | g/kWh | | | | | | | |

| | Coated | Baseline | % Reduction |
|---|---|---|---|
| HC | 0.855357 | 1.101877 | 22.4% |
| CO | 2.858434 | 3.66792 | 22.1% |
| $CO_2$ | 983.3241 | 908.0019 | −8.3% |
| NO | 8.17224 | 5.867477 | −39.3% |
| $NO_2$ | 0.543094 | 0.853066 | 36.3% |
| Particulate | 1.392242 | 1.937068 | 28.1% |

The raw data associated with the various runs used to arrive at the above reductions is provided in Tables 5 and 6. Table 5 represents data associated with the baseline engine. Table 6 represents data associated with the use of the coated cylinder head. Four test sets were conducted for both baseline and coated conditions, with the engine rpm being set in accordance with ISO 8174 Part 4.

The above data illustrate the potential for reduction of particulate matter (hereafter "PM") constituents in the exhaust stream. Also, unburned hydrocarbons and carbon monoxide emissions are reduced. The amount of the carbon dioxide constituent showed an increase, indicative of a more complete combustion of the hydrocarbon based fuel.

Using the characteristics of the Yanmar engine allows examination of the effect of coating various surfaces on the SAC to $SA_p$ ratio. The engine has an estimated piston surface area of 8011.6 mm.sup.2. The piston (not shown) has an estimated diameter of 101 mm, as compared to the bore diameter of 102 mm. The pocket 302 formed in the head 304 is fairly flat, with the area surrounding the direct injection port 306 being pocketed. The surface area of the pocket is approximately 5890 mm.sup.2. The surface area of a top ring (not shown) would be approximately 91 mm.sup.2. If the rings were the only coated component, the SAC to SAp ration would be approximately 1.135. By coating only the top surface of the piston, an SAC to SAp ratio of 1 can be achieved. Coating the top surface of the piston and the pocket of the head (but not the valve faces) would yield an SAC to SAp ratio of approximately 1.73. Coating the pocket 302 of the head 304 and the intake valve face 308 and the exhaust valve face 310 would yield an approximate SAC to SAp ratio of 1.023.

Application Process

The coatings of the present invention may be applied to the combustion surfaces using a high-velocity-oxygen-flame process. Other suitable known application processes may also be used. It is believed that utilization of direct current (DC) heating of an engine component being coated promotes the bonding between the component and the coating. It is also believed that the use of the DC current generates an associated induced magnetic effect, further promoting the bonding between the coating and a component being coated. Alternately, the coating may be applied using a plasma process. The plasma process may not, however, create the same strength of bond between the coating and the component.

Reconditioned Head Market

One significant advantage of the present coating technology is the ability of the coating to be a component involved in the engine reconditioning process. Material frequently is removed from combustion chamber surfaces during operation or restoration. Particularly, machining may be required in order to correct surface tolerances where material removal has been such that components can no longer meet specifications. Previously, the components would be discarded since tolerances could not be met. Application of the present coating allows material to be added, potentially allowing previously un-useable components to be returned to service. The addition of the material may cover surfaces which are typically machined during a rebuilding process. The coating of the present invention does not necessarily prevent such machining. Accordingly, valve seats and the mounting surface between the head 304 and the block (not shown) may be accomplished using standard methods.

Additional Effects

As is apparent from the test data, one artifact of the use of the present coating is an increased exhaust temperature. This effect is believed to be associated with the additional chemical reduction of hydrocarbon molecules. The temperature of the exhaust stream may affect the performance of downstream catalysts. The elevated temperatures associated with the present invention may allow the downstream catalytic material to have a greater chemical effect, as well as assist the catalytic material in regenerating. Accordingly, the efficiency of down-stream catalysts may be improved due to the higher exhaust temperatures associated with the present coating.

The energy of the exhaust stream has been used to drive turbochargers, which use the exhaust stream energy to drive a compressor that compresses the fuel-air charge before it enters the combustion chamber. The efficiency of a turbocharger is dependant on the different between the upstream and downstream pressures and temperatures. Higher efficiency in the conversion of energy contained within the exhaust stream into mechanical energy therefore may accrue in conjunction with the use of the present coatings, as the higher exhaust stream temperature may result in higher gas volume for a given air-fuel charge.

Application to Internal Combustion Engines Using Fuels Other than Diesel Fuel

Although the presently preferred embodiment of the invention envisions application of the coating of the present invention to combustion surfaces of a diesel fueled engine, the coating may be applied to other engines using fuels which rely on the oxidation of hydrocarbon molecules as an energy source. Such fuels may include petroleum based fuels, alcohol based fuels, gaseous fuels such as natural gas or propane, or fuels synthesized from other sources. The catalytic effect of the nickel surface on hydrocarbon fuels using lighter fractions may be less pronounced than with the diesel fuels, however the benefit of application of the coating of the present invention may be warranted as lower emission requirements and higher fuel prices affect the operational constraints of internal combustion engines.

One particular application to which the present invention is believed amenable are engines using dimethyl ether ($CH_3OCH_3$), either in straight diesel cycle, spark assisted ignition, or spark ignited engines. Dimethyl ether is believed to be an alternate fuel for commercial diesel engines. The use of dimethyl ether in diesel cycle engines has yielded reduced NOx emissions, however HC and CO emissions are increased. It is believed that the use of a nickel coating applied to the combustion chamber of an internal combustion engine using dimethyl ether would therefore exhibit reduced NOx, CO and HC emissions due to the inherent qualities of the dimethyl ether in conjunction with the catalytic reaction associated with the nickel coating.

The present invention may be embodied in other specific forms than the embodiments described above without departing from the spirit or essential attributes of the invention. Accordingly, reference should be made to the appended claims, rather than the foregoing specification, as indicating the scope of the invention.

What is claimed is:

1. An internal combustion engine having at least one reciprocating component, a bore within which the at least one reciprocating component reciprocates, and a closure over one end of the bore associated with the at least one reciprocating component, said reciprocating component having at least one combustion face, said combustion face defining a combustion face area, said reciprocating component further reciprocating relative to the closure and having a position at which the combustion face is at a closest point to the closure, wherein a combustion volume within which an air/fuel mixture is combusted is defined at least in part by the combustion face of the reciprocating component, and a surface of the closure, wherein at least a portion of the surfaces which define the combustion volume are coated with a single, substantially homogenous metallic coating comprising between greater than 15% and about 80% nickel and between about 10% and about 37% chromium, such that when the combustion face is at the position at which the combustion face is at a closest point to the closure, the coating covers an area of the combustion surfaces at least as large as approximately 10% of the area of the combustion face, and further wherein said coating is exposed to combustion gases.

2. An internal combustion engine having at least one reciprocating component, a bore within which the at least one reciprocating component reciprocates, and a closure over one end of the bore associated with the at least one reciprocating component, said reciprocating component having at least one combustion face, said combustion face defining a combustion face area, said reciprocating component further reciprocating relative to the closure and having a position at which the combustion face is at a closest point to the closure, wherein a combustion volume within which an air/fuel mixture is combusted is defined at least in part by the combustion face of the reciprocating component, and a surface of the closure, wherein at least a portion of the surfaces which define the combustion volume are coated with a single, substantially homogenous metallic coating comprising between about 25% and about 37% chromium such that when the combustion face is at the position at which the combustion face is at a closest point to the closure, the coating covers an area of the combustion surfaces at least as large as approximately 10% of the area of the combustion face, and further wherein said coating is exposed to combustion gases.

* * * * *